S. WIDMAR.
TELESCOPE OR FIELD GLASS.
APPLICATION FILED JUNE 16, 1908.
937,351.
Patented Oct. 19, 1909.
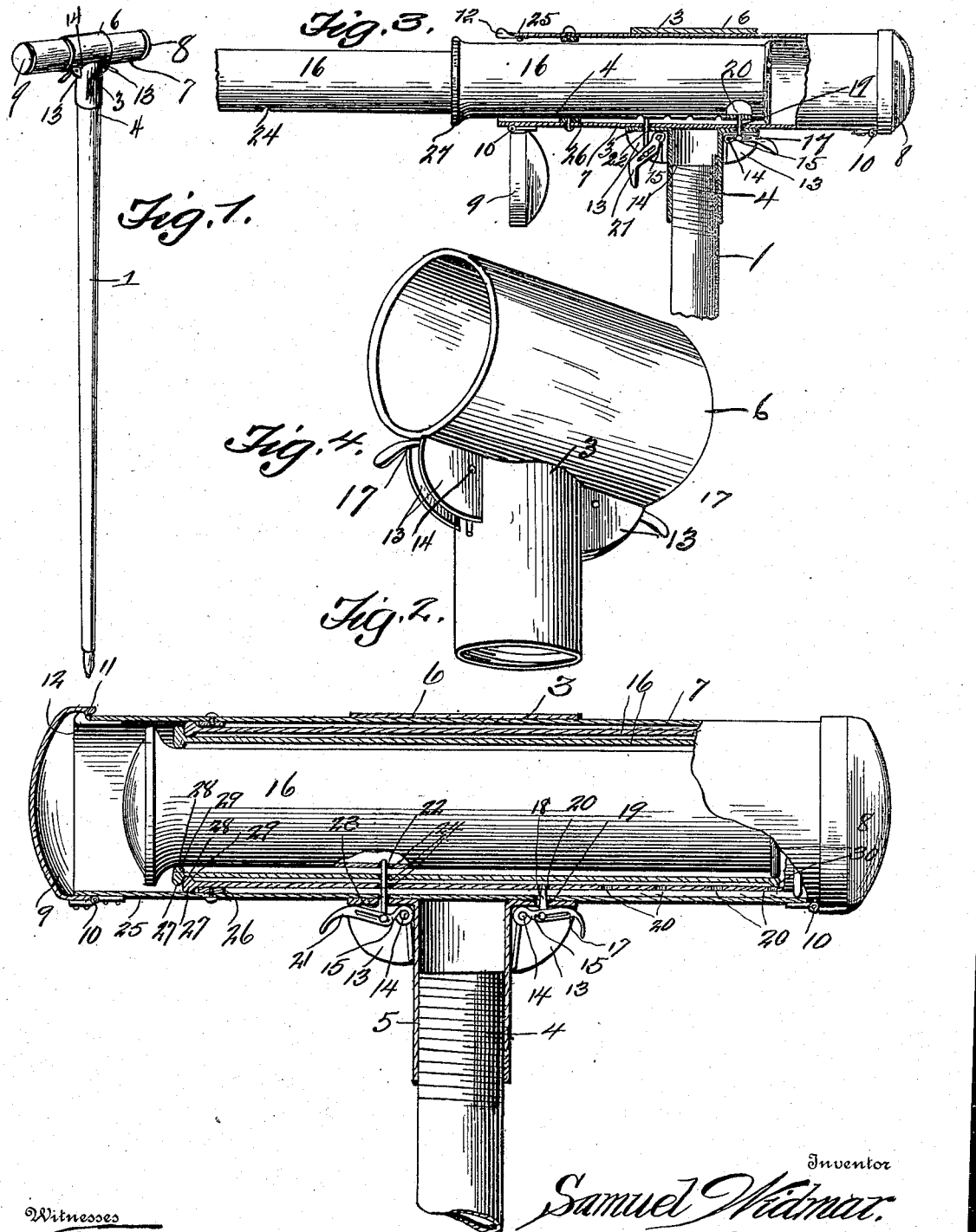

UNITED STATES PATENT OFFICE.

SAMUEL WIDMAR, OF PEORIA, ILLINOIS.

TELESCOPE OR FIELD GLASS.

937,351.  Specification of Letters Patent.  Patented Oct. 19, 1909.

Application filed June 16, 1908. Serial No. 438,876.

*To all whom it may concern:*

Be it known that I, SAMUEL WIDMAR, a citizen of the United States, residing at Peoria, in the county of Peoria and State of Illinois, have invented a new and useful Telescope or Field Glass; and I do hereby declare the following to be a full, clear, and exact description of the invention, such as will enable others skilled in the art to which it appertains to make and use the same.

The invention about to be set forth pertains to a new and useful telescope or field glass carried by a cane; and the invention in its fundamental principles resides particularly in providing a T union or joint member carried by a cane, through which a transverse tube is positioned, each end of which is provided with a closure having catch devices, and in which tube or shell the sections, that is, the telescopic sections, of the spy, telescope or field glass are disposed or carried, as will be clearly manifest.

A further object of the invention resides especially in spring catches designed for the purpose of holding the telescopic sections of the field glass in closed position, and within the tube or shell, which spring catches prevent the innermost section of the field glass from being removed from the tube or shell, that is, when the several telescopic sections of the field glass are extended, as shown clearly in Figure 3.

The invention aims as a further object to allow one of these spring catches to hold the tube or shell securely in position within the transverse portion of the T union, as will be clearly evident.

This invention comprises further objects and combinations of elements which will be hereinafter more fully described, shown in the accompanying drawings, and the novel features thereof will be pointed out by the appended claims.

The features, elements and the arrangement thereof, which constitute the above entitled invention, may be changed and varied, that is to say, in an actual reduction to practice with the understanding that the changes and variations accruing from said reduction to practice are limited to the scope of the appended claims.

To obtain a full and correct understanding of the details of construction, combinations of features, elements and advantages, refer-
ence is to be had to the hereinafter set forth description and the accompanying drawings in connection therewith, wherein—

Fig. 1 is a perspective view, clearly illustrating a transverse tube or shell carried by the upper portion of a cane by means of a T union or joint and showing closures carried by the ends of said shell or tube. Fig. 2 is a sectional view through the telescope, showing in section the transverse tube or shell, so as to clearly illustrate the several telescopic sections of the spy, telescope or field glass, and also clearly illustrating the spring elements or devices, for retaining the several sections of the field glass in position. Fig. 3 is a view partly in section, clearly illustrating the several sections of the telescope or field glass extended. Fig. 4 is a perspective view of the transverse tube or shell, illustrating the flanges or walls, which support the spring catches.

In regard to the drawings, wherein similar reference characters indicate corresponding parts in the several illustrations, by figures, 3 designates a T union or coupling which is attached by means of threaded connections 4 and 5 to a cane 1, as shown clearly in Figs. 2 and 3 of the drawings. This T union or coupling is provided with a transverse portion 6, through which a tube or shell 7 is positioned, to the free end of which closures 8 and 9 are hinged, as seen at 10; these closures are provided with catch devices 11, which are designed to engage spring members 12, which are carried by the tube or shell 7, as seen clearly in Figs. 2 and 3 of the drawings.

Projecting from the under surface, that is, the cylindrical surface of the transverse portion 6 are flanges or walls 13, between which a pivot pin 14 is transversely disposed, and upon which spring catches 15 are pivoted, which coact between a portion of the T union or coupling and the plurality of telescopic sections 16 of the spy, telescope or field glass; that is to say, the free ends of these spring catches coact between said parts, as seen clearly in the sectional views of the drawings.

The arm 17 of one of the spring catches is provided with a lug 18 which is designed to insert itself through an aperture 19 of the said transverse portion 6, so as to engage an aperture 20 of the outermost telescopic section of the field glass, so as to prevent the entire removal of the same, especially when the other telescopic sections are extended. The arm 21 of the opposite spring element or device is provided with a pivoted elongated pin 22 which is designed for the purpose of insertion through the several apertures 23 and 24 of the said transverse portion 6 and the entire set of the telescopic sections of the field glass.

The end 25 of the transverse tube or shell 7 is provided upon its inner circumference with a shoulder 26, which is designed to be engaged by the annular shoulder 27 of one of the telescopic sections, as seen in the sectional views of the drawings, so as to limit the movement of the said section in one direction. The section having the annular shoulder 27 is provided upon its inner circumference, as at 23, with an annular shoulder 29, adapted for engagement by a shoulder 30, made integral with the adjacent section, so as to prevent disconnection of the said section, as will be clearly manifest. The other sections of the field glass are similarly constructed, as will be seen upon reference to Figs. 2 and 3 of the drawings, the parts thereof being similarly designated by the same reference characters.

From the foregoing, the essential features, elements and the operation of the device, together with the simplicity thereof, will be clearly apparent.

Having thus fully described the invention, what is claimed as new and useful, by the protection of Letters Patent, is:—

1. A device of the class described, embracing an inclosure or casing, a field glass embracing telescopic sections having interacting shoulders thereon for controlling the relative adjustment thereof, and spring retaining catches, pivoted to said inclosure or casing and adapted to engage the outermost and innermost sections of said field glass.

2. A device of the character described, including an inclosure or casing provided with means for carrying the same, and a field glass comprising a series of telescopic sections having interacting shoulders and spring catches, having handled members pivoted to said casing and provided with slot engaging pins or detents passing through said casing and engaging the outermost and innermost members or sections of said field glass respectively.

In testimony whereof I have signed my name to this specification in the presence of two subscribing witnesses.

SAMUEL WIDMAR.

Witnesses:
CHESTER SCOTT,
JOHN J. SCHIFELING.